United States Patent
Waggoner

(10) Patent No.: US 12,217,392 B1
(45) Date of Patent: Feb. 4, 2025

(54) TECHNIQUES FOR PRESERVING ORIGINAL LUMA WITH NOISY CLAMPED SOURCES

(71) Applicant: Amazon Technologies, Inc., Seattle, WA (US)

(72) Inventor: Charles Benjamin Waggoner, Portland, OR (US)

(73) Assignee: Amazon Technologies, Inc., Seattle, WA (US)

(*) Notice: Subject to any disclaimer, the term of this patent is extended or adjusted under 35 U.S.C. 154(b) by 398 days.

(21) Appl. No.: 17/851,942

(22) Filed: Jun. 28, 2022

(51) Int. Cl.
*G06T 5/40* (2006.01)
*G06T 5/70* (2024.01)
*G06T 7/90* (2017.01)
*G06V 10/22* (2022.01)
*G06V 10/50* (2022.01)

(52) U.S. Cl.
CPC .............. *G06T 5/40* (2013.01); *G06T 5/70* (2024.01); *G06T 7/90* (2017.01); *G06V 10/22* (2022.01); *G06V 10/50* (2022.01); *G06T 2207/10024* (2013.01)

(58) Field of Classification Search
CPC ...... H04N 9/64; H04N 23/6811; H04N 23/84; H04N 9/646; H04N 1/60; H04N 9/77; H04N 25/60; H04N 23/81; H04N 25/611; H04N 23/88; H04N 5/213; G06T 5/00; G06T 5/70; G06T 2207/10024; G06T 5/94; G06T 7/90; G06T 5/40; G06T 5/20; G06T 7/11; G06T 7/136; G06T 2207/20192; G06T 2207/20004; G06V 10/50; G06V 10/22; G06V 10/30; G01N 2021/8887

See application file for complete search history.

(56) References Cited

U.S. PATENT DOCUMENTS

| | | | |
|---|---|---|---|
| 9,113,089 B2* | 8/2015 | Zhang | H04N 23/741 |
| 10,062,154 B1* | 8/2018 | Liu | G06T 5/92 |
| 10,659,749 B2* | 5/2020 | Kadu | H04N 19/186 |
| 2011/0216984 A1* | 9/2011 | Tezuka | G06T 5/20 |
| | | | 382/260 |
| 2013/0321672 A1* | 12/2013 | Silverstein | G06T 5/77 |
| | | | 348/E5.022 |
| 2013/0321675 A1* | 12/2013 | Cote | H04N 23/843 |
| | | | 382/167 |

* cited by examiner

*Primary Examiner* — Aaron W Carter
*Assistant Examiner* — Courtney Joan Nelson
(74) *Attorney, Agent, or Firm* — Kilpatrick Townsend & Stockton LLP

(57) ABSTRACT

Techniques are disclosed for correcting noisy clamped image sources while preserving original luma, chroma, or other channel value. A computing device can receive an image that has a plurality of pixels associated with respective channel values. The computing device can then determine a region of the image for correction and generate a histogram of the respective channel values in the region. Based on the histogram, the computing device can generate a corrected histogram of corrected channel values. The computing device can then denoise the corrected channel values.

20 Claims, 8 Drawing Sheets

TECHNIQUES FOR PRESERVING ORIGINAL LUMA WITH NOISY CLAMPED SOURCES

BACKGROUND

Image and video sources can include random noise, either as an artifact of the imaging process, the recording media, or an intentional processing effect to apply a "grainy" look to the image. This noise presents itself as a variation in the value of the pixels of the image, which in turn may represent the image information as separate channels for red, green, and blue (RGB) color or separate channels for brightness information (luma, e.g., "black and white") and color information (chroma), depending on the format. Certain video formats may specify pixel values that correspond to the lowest and highest values of the luma. Because the noise in the image can exceed these specified lowest and highest values, it can be difficult to digitally process noisy video sources while preserving accurate values for luma and chroma.

BRIEF DESCRIPTION OF THE DRAWINGS

Various embodiments in accordance with the present disclosure will be described with reference to the drawings, in which.

DETAILED DESCRIPTION

Figure 1:
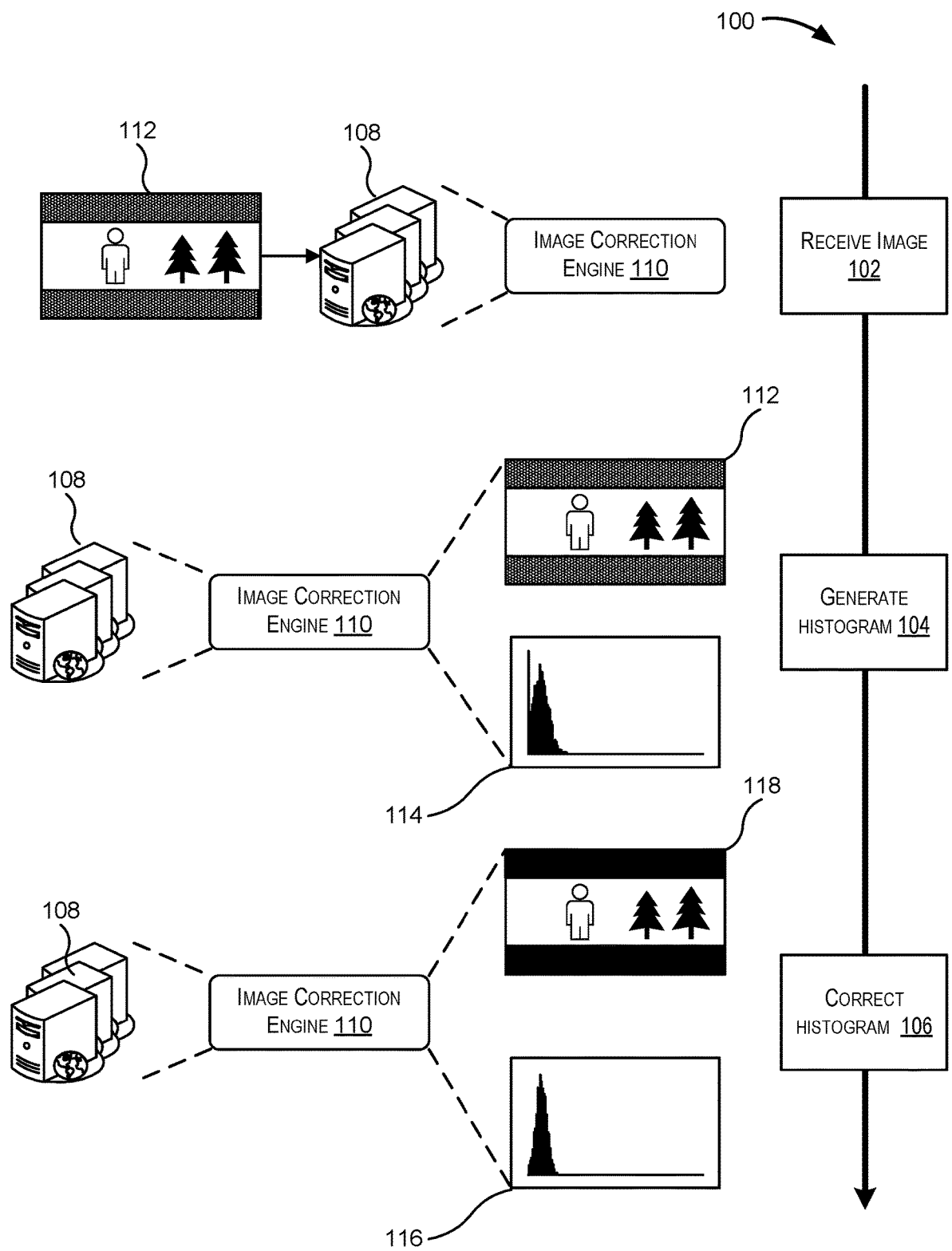
FIG. 1 is a simplified block diagram and associated flow chart of an example process to correct a noisy clamped image, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems, methods, and computer-readable media for preserving accurate luma values in video and image sources when those sources contain noise and are subject to "clamping" or other level-shifting effects during encoding. Several standards exist for specifying the format of a digital image (or digital video frame) as well as the output settings of hardware for displaying those images. Depending on the standards, the level (pixel value) that corresponds to the minimum or maximum value of the pixel may be set to a value that is higher or lower than the value that can be represented by the image data. For example, an image may have pixels with values of 0 representing black (with values greater than zero representing progressively brighter grays), but a video encoding standard may specify that black has a value of 16. Converting between the two specifications may require rescaling, where values that fall below (or above) the nominal minimum (or maximum) value are set to the nominal value. Such rescaling or clamping may produce undesirable effects if the source image is noisy. The techniques presented in this disclosure can be used to detect clamped, noisy images and correct for the clamping effects to preserve accurate channel values.

A color digital image typically contains image information as three different values for each pixel in the image, with each value corresponding to one of three channels for the image. Usually, the channels are separated into RGB, such that each pixel has a value for red, a value for green, and a value for blue, with the combination of the values representing the color of the pixel. Color images typically contain 24 bits of image information, with 8 bits for each RGB channel. The pixel values can then take on integer values from 0 to $2^8-1=255$ bits for each channel. Deeper color formats exist, including 10, 12, and 16 bits per channel, with correspondingly larger ranges of pixel values.

Instead of three RGB channels, the image information may be separated into a channel for luma (Y or Y'), representing the "brightness" of the image, and two channels for chroma (U and V, U' and V, $C_b$ and $C_r$), representing the color values for the image. In the Y'UV system, the achromatic, "black and white" portion of the image information is given by the luma Y', with the lowest value of Y' representing black and the highest value of Y' representing white. The luma is a combination of the RGB pixel values, while the chroma values U and V are weighted differences between luma Y' and the red and blue color values R' and B'. The prime (') above indicates gamma correction of the corresponding value, which is a nonlinear correction to account for the sensitivity of the human eye to different colors.

As mentioned briefly above, in the case of luma, standards for different video encoding formats may set a nominal value to represent black and white, the minimum and maximum values to be displayed as those colors. For instance, the nominal black may be 16 while nominal white may be 235. Similarly, the chroma channels U and V may have nominal minima and maxima at values of 16 and 240, respectively. Noise in the image appears as variance of the pixel values from some nominal value. The noise may be an effect of the image creation process, including noise in the hardware or physical media (e.g., film) used to capture the image or video. The noise may also be intentionally added using filters or other techniques to achieve a particular visual effect (e.g., a grainy appearance). Random noise will have a normal distribution (Gaussian) of the variance in values around the nominal value. For example, in an image with a region of nominally black pixels (Y'=16), the noise in that region will cause some black pixels to have a slightly higher luma value and some black pixels to have a slightly lower luma value than nominal. Because the noise is normally distributed, the average luma value for the region will still be the nominal value (Y'=16), but individual pixels may be slightly brighter or darker than the nominal value. A similar distribution of noisy pixel values can occur at the value for nominal white (Y'=235).

During an encoding process, the pixel values may be clamped to enforce the nominal value. Pixel values that fall below (or above) the nominal value are set to the nominal value. Thus, noisy black pixel values below Y'=16 may be set to 16, while noisy black pixels above Y'=16 are unchanged. The result is an artificial boost in the average luma value for the black pixels (and a corresponding artificial reduction in the average luma value for the white pixels). When displayed, the region of black pixels in the image may appear as a noticeable gray rather than black. Moreover, in a video stream, the frame-to-frame noise distribution may be different, so that the clamping effects induce a noticeable shifting or "boiling" effect when the clamped video frames are displayed in sequence, which may be undesirable from the perspective of the original creator of the image and may detract from a user's visual experience of the image.

To correct for the clamped luma values, a computer system implementing an image correction engine can receive an image and generate a histogram or similar profile of the luma values of the image. If the image has clamped luma values, the effect can appear as a distortion of the expected Gaussian distribution of the noise at the nominal pixel value. For example, in an image with significant regions of black pixels, noise will cause the black pixels to appear normally distributed about the nominal value. If that value has been clamped, the histogram will show the distribution cut off at the nominal value, with a large spike in pixel counts at that nominal value owing to the pixel values below nominal being scaled to the nominal value. The image correction engine can correct the cut off histogram by determining an approximate profile to fit the noise distribution based on the distribution above the nominal or cut off value. Using the corrected profile, noise reduction (denoising) can be applied to the pixels near the nominal value to reduce the variance in pixel values, thereby narrowing the width of the distribution and preserving the average luma value at the nominal value.

Additionally, the image correction engine can apply denoising to the pixels in an image near the nominal value prior to an encoding that would introduce clamping. By denoising prior to the encoding, the effects of setting below-nominal pixel values to the nominal value is reduced, since the number of below-nominal pixels is reduced. The image correction engine may apply the denoising to pixels near the nominal minimum/maximum values while preserving the original values for pixels with moderate (midtone) luma values, since the noise may be an intended effect of the image and may only be undesirable in large regions of black/white pixels.

For exemplary purposes, the techniques described in this disclosure refer to clamping of luma values. However, the techniques apply to clamped noisy chroma channels in the image as well. In addition, the techniques apply both to clamping at a low nominal value (minimum channel value) and a high nominal value (maximum channel value). Because the human eye perceives differences in luma more sensitively than differences in chroma, and especially differences in luma closer to black, the effects of clamped noisy luma channels is more pronounced from the perspective of a person viewing the image.

As a result, regions of nominally black pixels in a noisy image or a video are particularly challenging to encode in a format that displays correctly on various systems that may use different standards. One particular example is the use of letterboxing and pillarboxing or other matting to preserve an image aspect ratio when displaying the image at a different aspect ratio. The letterbox regions should display at the nominal black level, and so can account for large regions of black pixels susceptible to the clamping effects and amendable to the techniques described herein.

The techniques described herein provide several advantages over conventional image encoding techniques. For example, by applying luma-preserving denoising methods to an image or video source prior to an encoding that may introduce clamping, more computationally expensive post-processing operations to correct for the noisy source are reduced. The techniques can also be implemented as part of a video encoding pipeline to streamline the processing of legacy video sources. Once a luma-preserving correction has been applied, the source file may be displayed by both systems that clamp nominal luma values and systems that do not, thereby reducing the need to track the luma input/output settings of various source files and/or store different source files for different display systems. Finally, the techniques provide a images and video that more accurately match the intent of the sources creator and provide an improved viewing experience for viewers.

Turning now to the figures, FIG. 1 is a simplified block diagram and associated flow chart of an example process 100 to correct a noisy clamped image 112, according to some embodiments. The diagram shows elements of a computer system corresponding to the blocks of the process 100. The process 100 can be performed by a computer system 108, which can include a server device, a user device, or any suitable combination of computing devices. Additional details about computing systems that are capable of performing the techniques of the disclosure are provided below with respect to FIGS. 6 and 8. In some embodiments, the computer system 108 can implement an image correction engine 110, which can be a collection of software applications, services, and/or other processes configured to perform the techniques described herein, including correcting image luma values with clamped noisy values.

The computer system 108 may be a component of a system that can provide a video processing pipeline for encoding video from various sources, including legacy media sources, into formats for delivery to consumers over various content systems, including streaming video. A video processing pipeline can include modules for noise reduction, compression, artifact correction, resolution scaling, and other similar processes. The techniques for luma-preserving correction of noisy sources may be implemented as one part of the video processing pipeline. For example, the luma-preserving correction techniques may be applied prior to other post-processing efforts.

The process 100 can begin at block 102 with the computer system 108 receiving an image 112. As depicted in FIG. 1, image 112 can be an image frame (e.g., a frame of a video) that has letterboxing, such that a portion of the image contains pixels having nominally black values. The image 112 may be noisy and have a clamped black level, as depicted by the pattern of the letterboxed regions. The image 112 may otherwise be a color image.

To correct for the clamping in the image 112, the image correction engine 110 can generate a histogram 114 of image 112, at block 104. The histogram 114 may show the clamping effect as a large number of pixels at the minimum luma value, which creates a distortion of the otherwise normally distributed values near the minimum luma value. Based on the histogram 114, the image correction engine 110 can determine that the image 112 is a noisy clamped image. Determining that the image 112 has been clamped can include detecting the large number of counts at the nominal minimum luma value. For example, the histogram may indicate that the number of pixels having the nominal black value exceeds some threshold value relative to the total number of pixels near the nominal value (e.g., the total in the distribution). Determining that the image 112 has been clamped can also include detecting that the distribution at the nominal value is only a half normal distribution. In some embodiments, the image correction engine 110 may determine that image 112 has not been clamped but may be subject to a clamping process during a subsequent processing operation, for example as part of the video processing pipeline. Based on this determination, the image correction engine 110 may apply one or more operations of the histogram correction and denoising described below.

At block 106, the image correction engine 110 can correct the histogram 114 to produce a corrected histogram 116. The corrected histogram 116 can include pixel counts that are normally distributed about the nominal black luma value. Correcting the histogram can include operations that adjust the value of the pixels at the nominal luma value (or other cut off value), such that the pixels are treated as having the corrected luma value for the purposes of subsequent denoising operations. In instances where the histogram is cut off at the mean value of the distribution (e.g., one half of a normal distribution), the corrected histogram may be generated by mirroring the pixel values that are above the cut off value.

In some cases, the encoding of the image may not allow for pixel values below the nominal value, and so may not preserve the corrected values. In these cases, the corrected histogram may be a placeholder for pixel values for subsequent denoising operations. Values that were clamped to the nominal value may remain clamped after correction and denoising if they remain below the clamped value. However, by providing a corrected histogram, denoising operations on the pixels above the nominal value may be done in a manner that preserves the mean luma value at the nominal value, with values shifted toward the center of the distribution in such a way to preserve the normal distribution (e.g., randomness of the remaining noise). With a corrected histogram, the image correction engine 110 may output a corrected image 118 corresponding to the corrected histogram. In some embodiments, the correction operations may only be applied to pixels near the nominal value, leaving the other pixels of the image 112 unchanged. Thus, the corrected image 118 may exhibit letterboxes with reduced noise and average luma closer to the nominal black value as depicted by the solid black regions of corrected image 118 in FIG. 1. Noise present in other regions of the corrected image 118 may remain.

In some embodiments, the corrected histogram may instead be a profile or other analytic representation of the pixels in the image 112. For example, the image correction engine 110 may generate a corrected profile from histogram 114 that is an estimated Gaussian fit for the histogram 114 in the absence of the distortion due to the clamping. From the corrected profile, corrections to the pixel values in the image 112 can be determined and applied to produce the corrected image 118.

Denoising operations are well known in the art and can include linear and non-linear filtering, diffusion techniques, temporal adaptive and spatial-temporal adaptive methods, and the like. Typically, denoising requires careful consideration of the effects of the denoising operation on features of the image, including blurring, softened edges, and the loss of image information, particularly in the luma channel. For random noise that is normally distributed about the nominal black level, the denoising operations are more straightforward. Qualitatively, the denoising reduces the variance (6') of the distribution (narrowing the Gaussian curve) while preserving the mean of the distribution.

Figure 2:
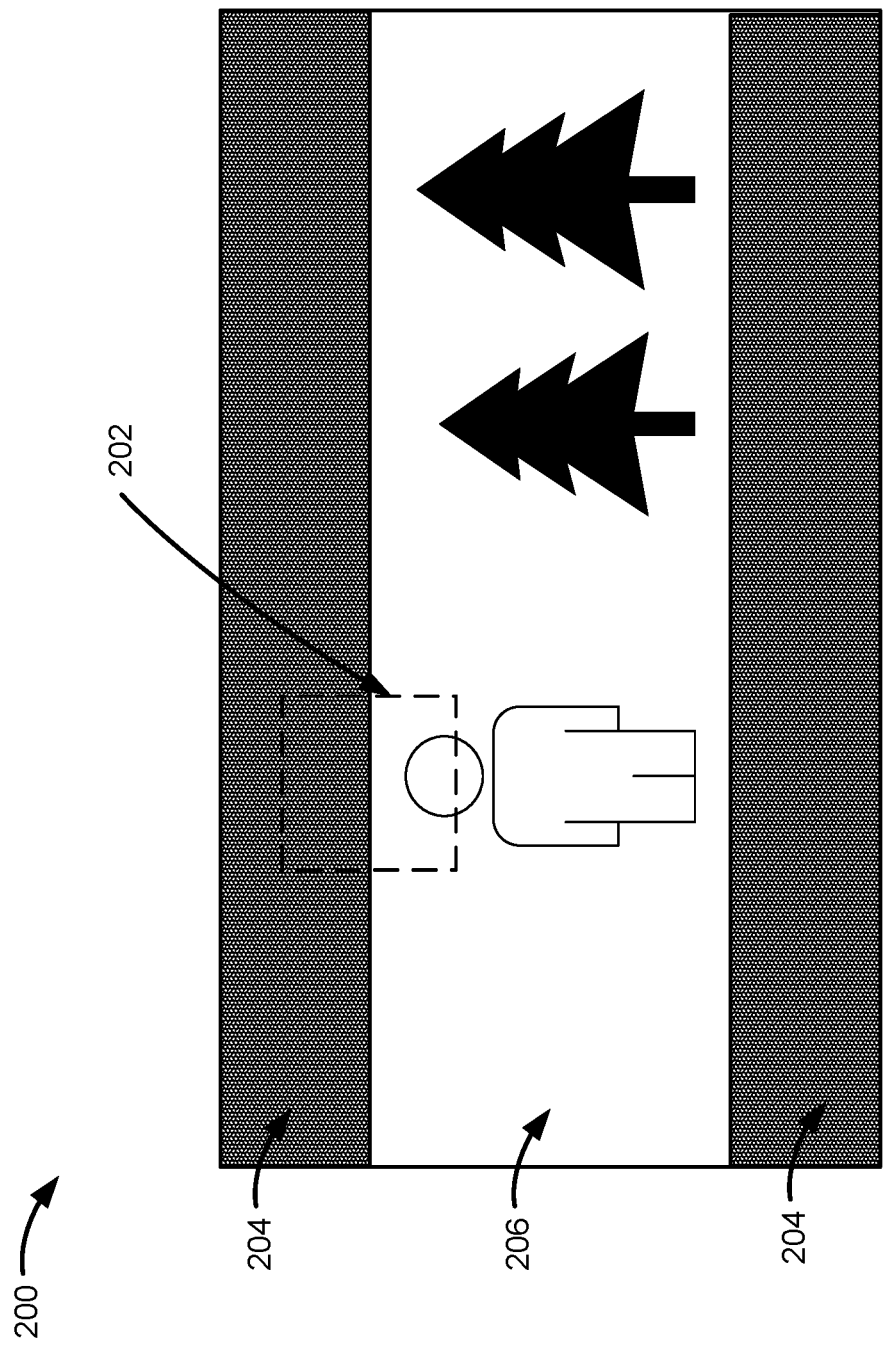
FIG. 2 illustrates an example image with noisy clamped luma values, according to some embodiments.

FIG. 2 illustrates an example image 200 with noisy clamped luma values, according to some embodiments. The image 200 may be similar to image 112 of FIG. 1 and can include letterboxes 204. The letterboxes 204 may be regions of nominally black pixels (Y'=16) that include noise and have been clamped to the nominal black value. The image 200 can also include a central image region 206 that contains the image of interest. The central image region 206 can have pixels with various luma and chroma values for the scene. As with many images, the central image region 206 may contain regions with pixels having values at or near the nominal values of the color system used for encoding the image. For example, the image could include regions of deep shadow, with a large number of pixels having luma values at or near nominal black. The image could also contain regions of lighted highlights, with a large number of pixels having luma values at or near nominal white. The luma-preserving correction techniques can detect and reduce noise within these regions in the central image region 206 as well as in the letterboxes 204.

When performing correction operations on the image 200, a computer system (e.g., computer system 108 of FIG. 1) can work with a region 202 within image 200. Region 202 may be a square or rectangular sub region of image 200. Region 202 may be sized to encompass a sufficient number of pixels to produce a well-sampled histogram. For example, region 202 may be 128×128 pixels, 256×256 pixels, 512×512 pixels, 128×256 pixels, or other combinations of length and width. The size of region 202 may also be selected to efficiently cover the image 200. For example, the region 202 may be sized to be integer fractions of the size of image 200.

For the region 202, a histogram can be generated for the pixels in the region. The histogram for region 202 can be corrected as described herein. Using the corrected histogram, the pixels in region 202 may be corrected to produce a corrected sub-image of image 200. Once the region 202 has been corrected, a new region may be selected adjacent to region 202 and the process repeated. Additional regions may be treated until the entire image 200 has been corrected. In some embodiments, successive regions may partially overlap. For example, a second region may be selected that partially overlaps with region 202. By overlapping the regions, the second region will include pixels that have values corrected from operations on region 202. The histogram of the second region may then reflect the partly corrected distribution of pixel values, resulting in faster or otherwise improved correction of the pixels in the second region.

Figure 3:
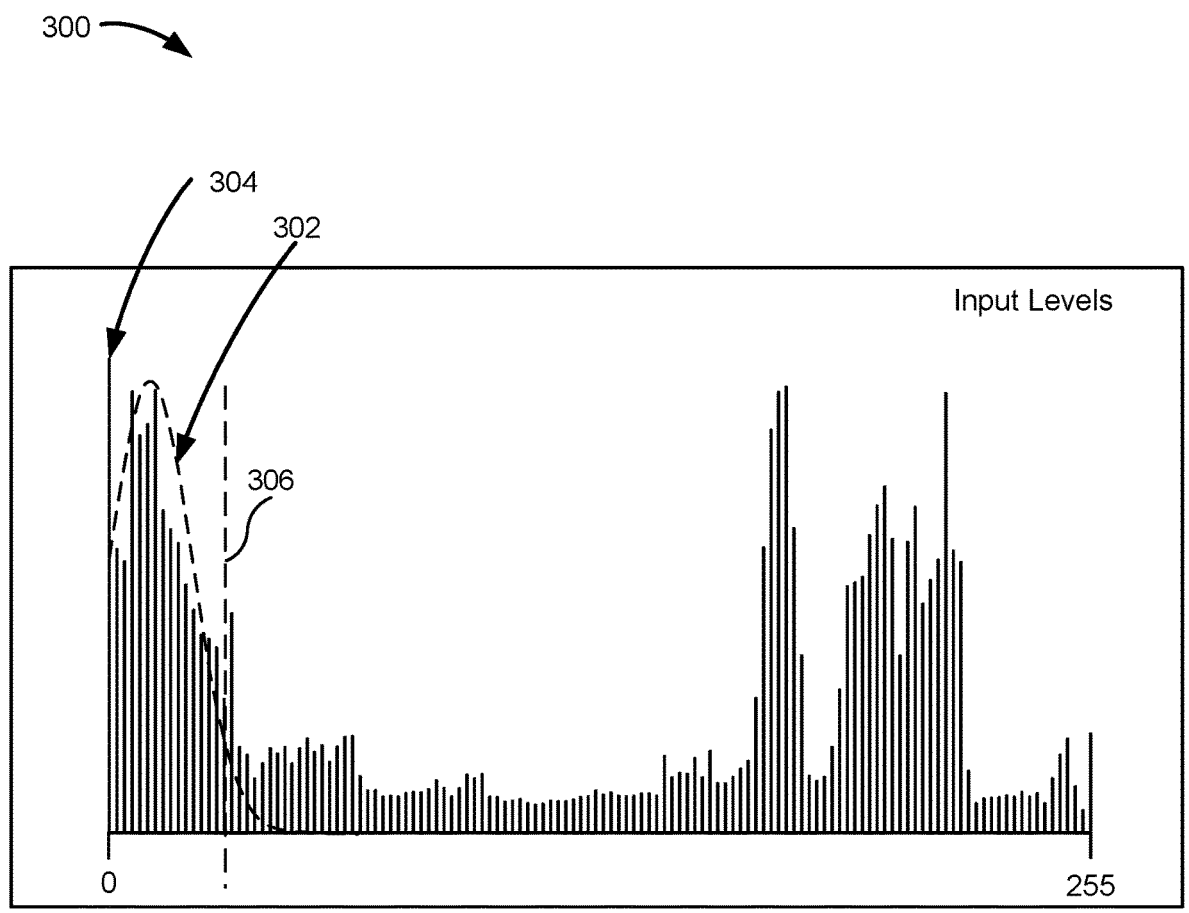
FIG. 3 depicts an example histogram of luma values for an image containing noisy luma values, according to some embodiments.

FIG. 3 depicts an example histogram 300 of luma values for an image containing noisy luma values, according to some embodiments. The histogram 300 may be an example histogram of image 200 of FIG. 2. In some embodiments, the histogram 300 may be a histogram for a region within a larger image, for instance region 202 of FIG. 2. As depicted in FIG. 3, the histogram 300 shows pixels for an 8-bit luma channel, with values from 0 to 255. The histogram 300 indicates several pixels with luma values near the minimum luma value as well as pixels with midtone luma values and relatively few pixels at or near the maximum luma value.

The histogram 300 indicates noise within the image, as shown by the normally distributed pixel values near the nominal black luma value highlighted by the dashed curve 302. The histogram 300 also indicates some amount of clamping at the 0 luma level, with a large spike 304 of pixel counts at Y'=0. The large number of pixels at the minimum luma level can result from noisy black pixels having values falling below the minimum value and then set to the minimum value according to the color system used in the image encoding.

The curve 302 approximates the distribution in the pixel values without considering the values at level 0. Accordingly, the peak of curve 302 may be close to the nominal black level (Y'=16). However, the average luma of the pixels near nominal black will exceed the mean value, since the average luma will include the pixels at level 0 instead of levels with "negative" luma values. If a denoising were applied to the pixel values without correcting for the clamping, the denoised pixel values may be "pushed" toward the enhanced average luma value rather than the desired average luma value at the nominal black level.

In some embodiments, the histogram 300 can include pixels with values relatively far away from the nominal black and nominal white values of the luma channel. It may not be desirable to apply correction techniques to these pixels since they are not likely to be affected by the clamping effects. To account for this, the histogram correction and denoising may be applied only to pixels below a threshold value 306. This threshold value 306 may be a midtone cutoff value indicating pixels that have luma values within the middle of the luma range. As one example, the midtone cutoff value may be Y'=48 in an 8-bit luma channel. For correction at or near nominal white, a midtone cutoff value may be Y'=205, such that histogram correction and denoising may be applied only to pixels above the midtone cutoff value.

In some embodiments, the threshold value 306 may be used to modulate the strength of a denoising algorithm applied to pixel values near the threshold value 306. For example, a denoising method may apply a shift to pixel values to bring those pixel values closer to the mean value of the (corrected) distribution. For the case of normally-distributed pixel values due to noise, the shift for each pixel value may depend on the luma level of that pixel. Pixels further away from the mean value may be shifted more than pixels close to the mean value. For instance, for a distribution with a mean at luma level 16, pixels having luma values of 20 may be shifted toward luma level 16 by a small amount, while pixels having luma values of 24 may be shifted toward luma level 16 by a larger amount. Pixels with luma values further away from the nominal black level are more likely to represent luma values of midtone pixels in the image, rather than as a result of noise in a nominal black luma level. That is to say, there may be an overlap in the distribution of noisy pixels near the nominal black level and pixels in the image that represent dark grays and blacks (e.g., a region of shadow in the image, a black-colored object, etc.). A large shift from a denoising method may result in distortion of these image pixels. For pixel values close to the threshold value 306, the shift applied from a denoising algorithm may be reduced to reduce the effects of denoising on dark image pixels. For pixel values that exceed the threshold value 306, no shift from a denoising algorithm may be applied.

In some embodiments, the threshold value 306 may instead be represented as a "cross-over region" of luma levels for which the effects of a denoising method on the pixel values are reduced for increasing luma levels within the cross-over region. For example, the cross over region may be defined by luma levels 24-48 of an 8-bit image luma channel. Within this cross-over region, the shifts of pixel luma values due to a denoising algorithm may be reduced, with a smaller reduction for pixel values close to 24 and a larger reduction for pixel values close to 48.

In some embodiments, the threshold value 306 (and/or the cross-over region) may be determined adaptively based on the denoising algorithm. The threshold value 306 may be different for different regions within the same image or for corresponding regions in different (e.g., sequential) image frames, and may change for different steps in a denoising routine. An adaptively determined threshold value 306 can be beneficial when applying the techniques of this disclosure to regions with letterboxing, pillarboxing, and the like, by allowing for strong denoising in regions of images containing the letterboxing, while also allowing for denoising in regions of the image that contain shadows and other dark gray and black image content.

Figure 4A:
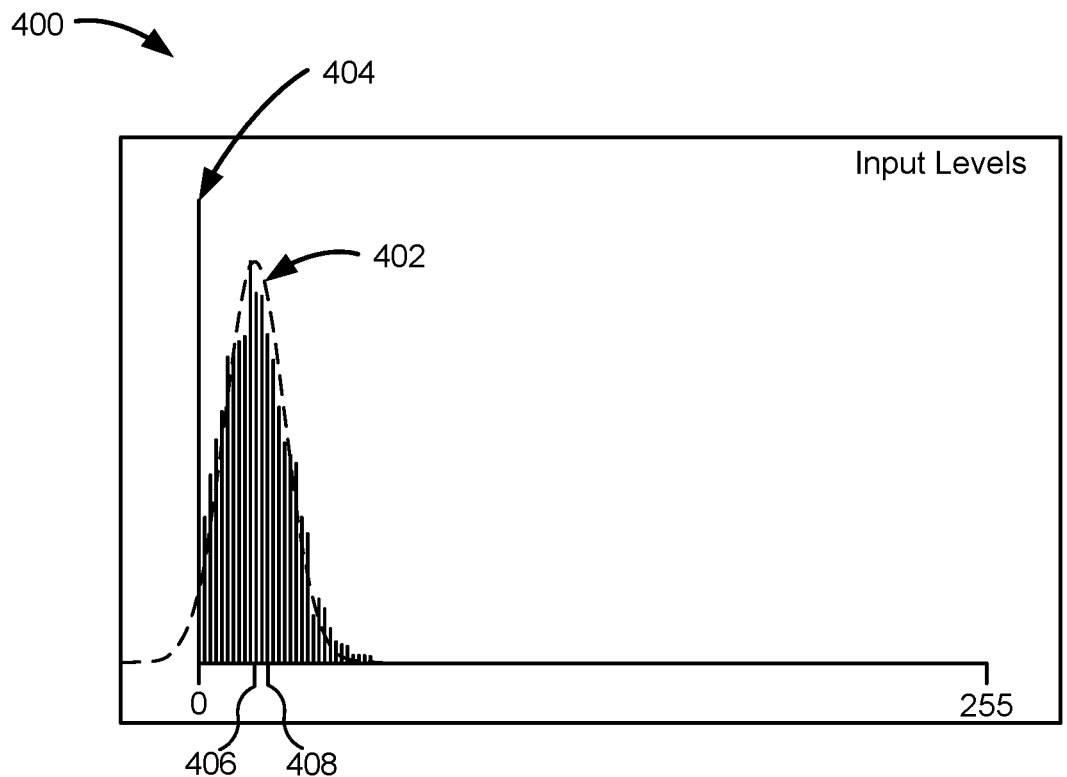
FIGS. 4A and 4B depict example histograms of noisy images that have been clamped at low luma values, according to some embodiments.
Figure 4B:
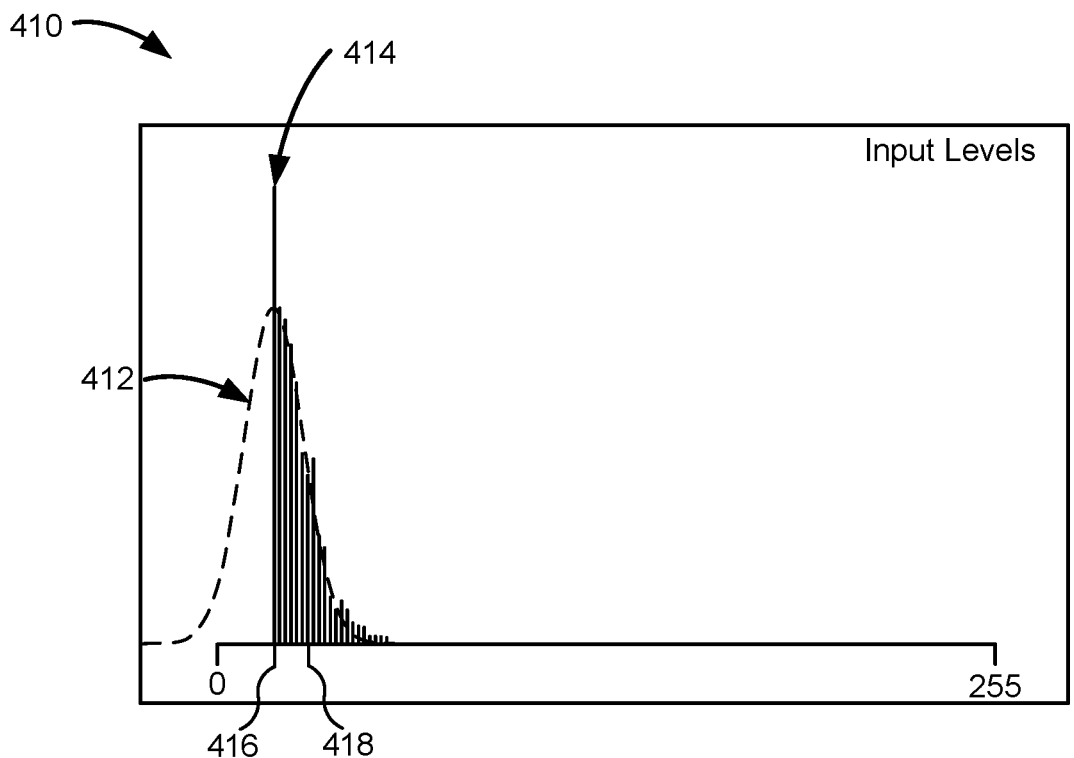

FIG. 4A depicts an example histogram 400 of a noisy image that has been clamped at a low luma value below the nominal black luma value, according to some embodiments. FIG. 4B depicts an example histogram 410 of a noisy image that has been clamped at a low luma value at the nominal black luma value. The images represented by the histograms 400, 410 of FIGS. 4A and 4B may be regions of black pixels, including letterboxes, pillarboxes, or other imaging mattes or masks, for example letterboxes 204 of FIG. 2.

Similarly to FIG. 3, FIG. 4A indicates that the luma values may be clamped by the presence of a large spike 404 in the number of pixels at luma value 0. The histogram 400 also exhibits noise in the distribution of the luma values, as shown by curve 402.

Because of the clamping effects, the average luma value 408 may be greater than the mean value 406 of the curve 402. Denoising the pixel values of the histogram 400 without correcting for the clamped pixel values at level 0 may result in a narrower distribution (i.e., reduced variance) that is still centered at the higher average luma value 408, which may be noticeable in the output image as black pixels at a brighter level than the nominal black. By correcting the histogram 400, for example by fitting the pixel values to the curve 402, the denoising can reduce the variance in the distribution while preserving the mean value 406, which can be closer to the nominal black value for the luma channel. In an embodiment, the histogram 400 may be corrected by determining a luma offset value and shifting a portion of the of the pixels luma values by the luma offset value. For example, for pixels at the large spike 404, a luma offset value may be subtracted from a portion of the pixels so that the corrected histogram has a number of pixels with luma values below luma value 0.

As shown by FIG. 4B, one example of a clamped histogram is one where the clamped luma level occurs at the nominal black luma level. The resulting histogram can appear as a distribution of luma values that have lost one half of the distribution, which may indicate the presence of clamping. The histogram 410 of FIG. 4B can also indicate that the luma values may be clamped by the presence of a similar large spike 414 in the number of pixels at luma value 16. As with histogram 400 of FIG. 4A, the histogram 410 can have an average luma value 418 that is higher than the nominal black luma value 416. Prior to the clamping effect, the nominal black luma value 416 may have been the average luma value of the pixels in the image. Denoising the pixel values of the histogram 410 may result in a distribution of luma values that retains the average luma value 418 of the clamped distribution rather than the average luma value of the original noisy image before the clamping effect.

Figure 5:
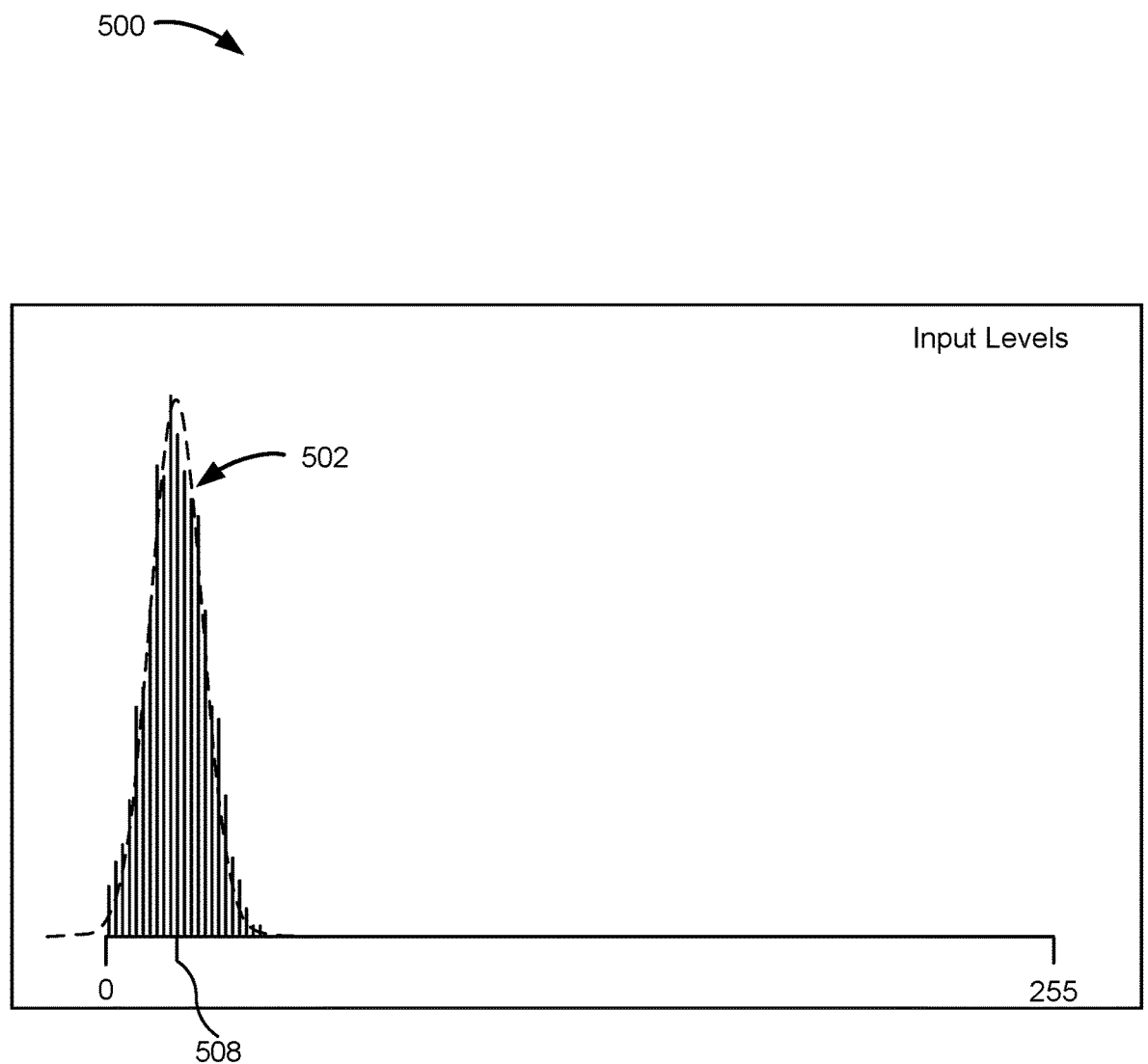
FIG. 5 depicts an example corrected histogram of a corrected noisy image, according to some embodiments.

FIG. 5 depicts an example corrected histogram 500 of a corrected noisy image, according to some embodiments. The corrected histogram 500 may result from applying corrections to the histogram 400 of FIG. 4 and denoising the pixels represented by the histogram. The curve 502 can indicate an estimated Gaussian distribution of the luma values after the corrections, with average luma value 508. Although denoising operations have been applied, some noise may remain in the image. The average luma value 508 may be closer to the nominal black luma value of the color system for the image.

Figure 6:
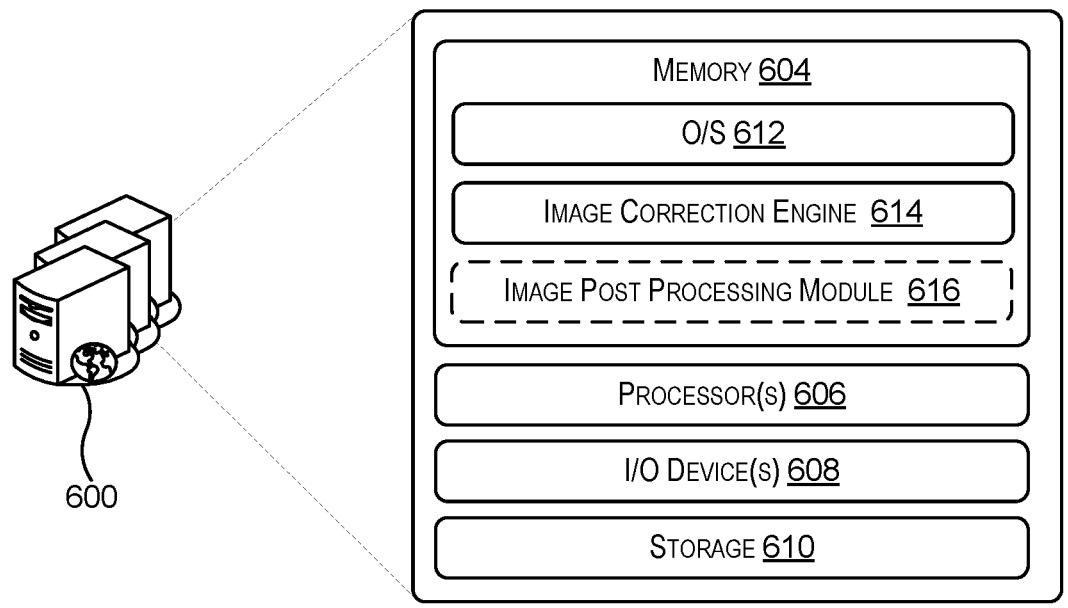
FIG. 6 is a simplified block diagram of an example architecture of a computer system, including a plurality of modules that may perform functions in accordance with at least one embodiment.

FIG. 6 is a simplified block diagram of an example architecture of a computer system 600, including a plurality of modules that may perform functions in accordance with at least one embodiment. The computer system 600 may be a server device, a user device (e.g., a mobile device or other suitable computing device. The computer system 600 may be an example of computer system 108 of FIG. 1. The computer system 600 may include more than one computing devices, including cloud devices, and may host an image correction engine 614, which may in turn be an example of image correction engine 110 of FIG. 1.

The computer system 600 can have at least one memory 604, one or more processing units (or processor(s)) 606, and one or more input/output ("I/O") device(s) 608. The processor(s) 606 may be implemented as appropriate in hardware, computer-executable instructions, firmware or combinations thereof. Computer-executable instruction or firmware implementations of the processor(s) 606 may include computer-executable or machine executable instructions written in any suitable programming language to perform the various functions described. The I/O device(s) 608 can include displays, monitors, touch screens, mouse, keyboard, or other I/O device.

The memory 604 may store program instructions that are loadable and executable on the processor(s) 606, as well as data generated during the execution of these programs, including images (e.g., images received from an image or video source or an upstream component of a video processing pipeline), histograms and corrected histograms, additional images (e.g., subsequent frames of a video), etc. Depending on the configuration and type of computer system 600, the memory 604 may be volatile (such as random access memory ("RAM")) or non-volatile (such as read-only memory ("ROM"), flash memory, etc.). In some implementations, the memory 604 may include multiple different types of memory, such as static random access memory ("SRAM"), dynamic random access memory ("DRAM") or ROM. The computer system 600 may also include additional storage 610, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 610 may be utilized to store data contents received from one or more other devices. For example, the storage 610 may store video sources used for processing and correcting the video source.

The memory 604 may include an operating system (O/S) 612 and one or more application programs, modules, or services for implementing the features disclosed herein, including an image correction engine 614. The image correction engine 614 may be configured to receive one or more images, generate histograms for the images, determine if the images are a clamped and/or noisy source image, and apply appropriate corrections according to the techniques described herein. The image correction engine 614 may, in some embodiments, be a component of a larger video processing pipeline, including additional modules for applying additional processing (e.g., filtering, compression, denoising, etc.) on the image. The additional modules can optionally include image post processing module 616 that can be configured to perform one or more post processing operations to the corrected images.

In some embodiments, the image correction engine 614 may be configured to determine a region of a received image and perform correction operations for the pixels in the region. The image correction engine 614 may subsequently determine a second region of the image that can partially overlap the region and perform correction operations for the pixels in the second region. The image correction engine 614 can repeat this process until the entire image has been corrected.

In some embodiments, the image correction engine 614 may be configured to receive a second image. The second image may be a subsequent image frame of a video, such that the image and the second image contain similar image information. Based on the corrected values from a first region in the first image, the image correction engine 614 may apply corrections within a second region of the second image. For example, a first region of letterboxing in the first image may correspond to a second region of letterboxing in the second image. Because the letterbox regions contain the same nominal black luma values, the corrected histogram of the first region may be used to determine correction values for the histogram of the second region.

Figure 7:
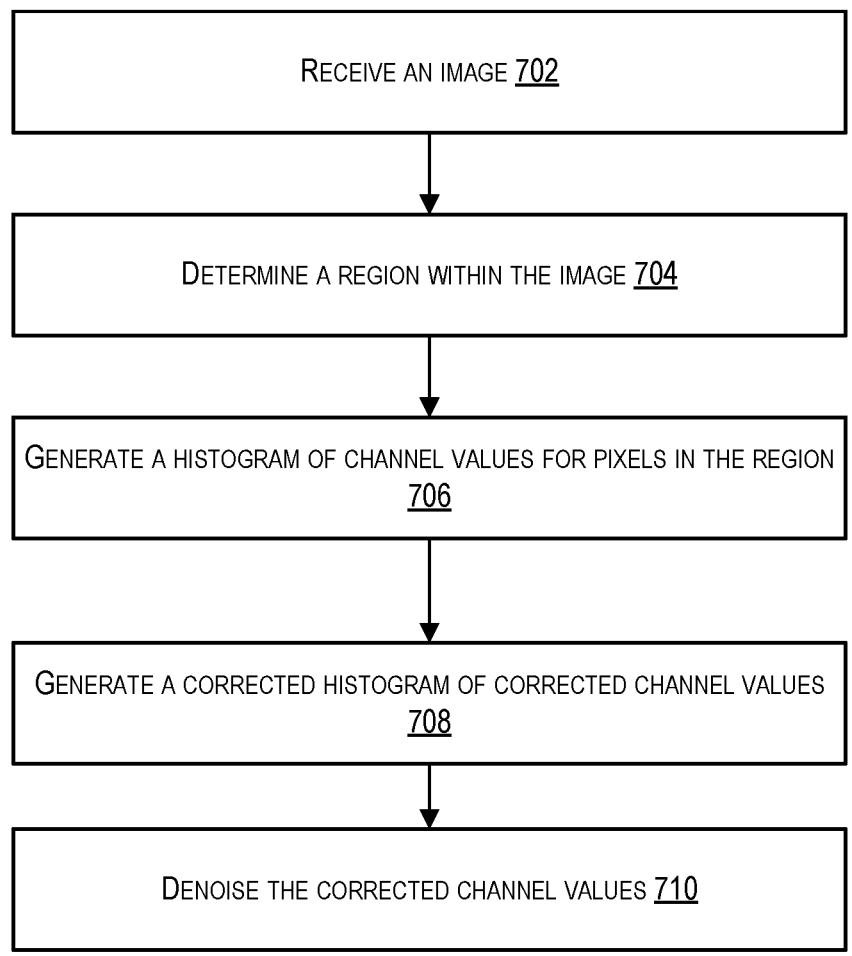
FIG. 7 is a simplified flow diagram of an example process for receiving an image, generating a profile of a noisy clamped luma channel, and correcting the profile, according to some embodiments.

FIG. 7 is a simplified flow diagram of an example process 700 for receiving an image, generating a profile of a noisy clamped luma channel, and correcting the profile, according to some embodiments. The process 700 may be performed by a computing device, including one or more components of a computer system. The computing device may be an example of computer system 600 of FIG. 6 or computer system 108 of FIG. 1. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at block 702 with the computing device receiving an image. The image can include a plurality of pixels, with each pixel associated with a respective channel value of a plurality of respective channel values. The channel values may be luma values, chroma values, RGB values, gamma corrected versions of the RGB values, and the like.

At block 704, the computing device can determine a region within the image. The region can include a subset of the plurality of pixels in the image. In some embodiments, the region can be the same size as the image. In some embodiments, a second region and other additional regions may be determined for additional iterations of the image correction techniques, such that the entire image is processed by the computing device.

At block 706, the computing device can generate a histogram of the plurality of respective channel values of the subset of the plurality of pixels in the region. The histogram may present the plurality of respective channel values as a distribution, which may indicate normally-distributed (e.g., Gaussian) noise in the channel values. The histogram may exhibit clamping effects, with a channel level bin of the histogram containing an excess number of pixels at a minimum channel level for the distribution. In some embodiments, the computing device can identify the clamping effects by determining that the number of pixels in the channel level bin exceeds a threshold number. For example, of the minimum channel level bin contains more than 25% of the total number of pixels in the histogram, then the histogram may exhibit clamping effects. In some embodiments, the channel level bin may be associated with a maximum channel value (e.g., if the clamping is occurring at or near nominal white luma values).

At block 708, the computing device can generate a corrected histogram of corrected channel values. In some embodiments, the computing device can determine an offset channel value and shift a portion of the pixel channel values by the offset channel value to produce the corrected histogram. In other embodiments, the minimum channel value may occur at or near the center of the distribution. Generating the corrected distribution can then include mirroring the channel values in the histogram with respect to the minimum channel value, thereby producing a histogram with symmetric channel values. In some embodiments, at least one of the corrected channel values is less than the minimum channel value. In embodiments applying corrections at or near the maximum channel value, at least one of the corrected channel values is greater than the maximum channel value.

Finally, at block 710, the computing device can denoise the corrected channel values for the subset of the plurality of pixels in the region. The denoising operation can produce denoised channel values (e.g., denoised luma values). The denoised channel values for the pixels may reduce a variance in the distribution of the channel values while preserving a mean channel value for the distribution. The denoised channel values may be used to generate a corrected image, for example, by combining the denoised channel values for pixels in a region with denoised channel values for pixels in other regions of the image.

Figure 8:
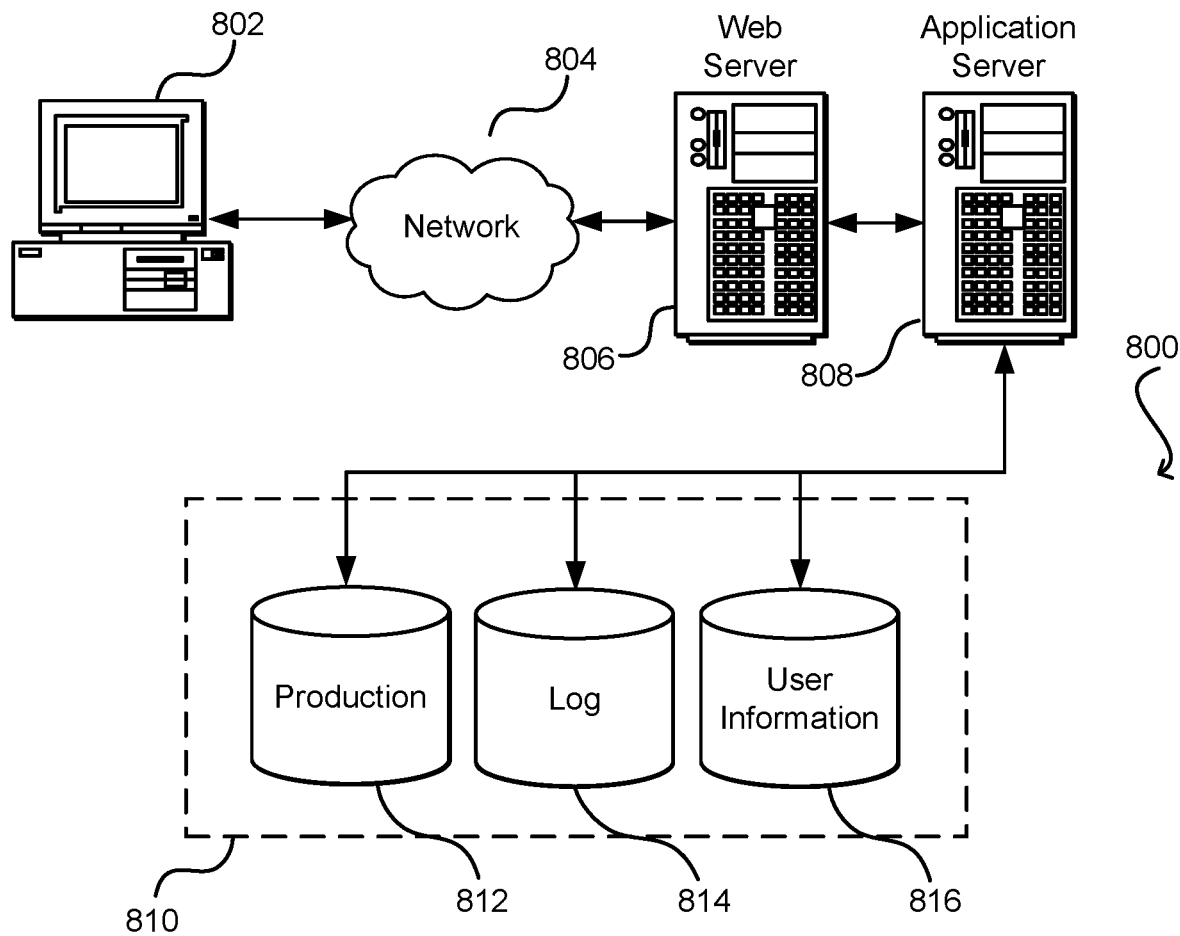
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a computing device, the method comprising:
    receiving, by the computing device, an image comprising a plurality of pixels, each pixel of the plurality of pixels associated with a respective luma value of a plurality of respective luma values;
    determining, by the computing device, a region within the image, the region comprising a subset of the plurality of pixels of the image;
    generating, by the computing device, a histogram of the plurality of respective luma values of the subset of the plurality of pixels in the region, the histogram corresponding to a distribution of the plurality of respective luma values in the region, and the distribution characterized by normally-distributed noise in the luma values;
    identifying, by the computing device, a luma level bin of the histogram containing a number of the subset of the plurality of pixels exceeding a threshold number, the luma level bin associated with a minimum luma value of the distribution;
    generating, using the histogram and based at least in part on the luma level bin, a corrected histogram comprising corrected luma values for the subset of the pixels, at least one of the corrected luma values being less than the minimum luma value;
    denoising, by the computing device, the corrected luma values by reducing a variance in the corrected luma values to produce denoised luma values for the subset of the plurality of pixels in the region; and
    generating, by the computing device, a corrected image region of a corrected image comprising a plurality of corrected pixels having the denoised luma values.

2. The method of claim 1, wherein the image is a first image, wherein the region is a first region, and further comprising:
    receiving, by the computing device, a second image;
    determining, by the computing device, a second region within the second image, the second region corresponding to a location defined by the region in the first image;
    generating, by the computing device, a second histogram of second luma values in the second region; and
    denoising, by the computing device, based at least in part on the denoised luma values for the first region, the second luma values to produce denoised second luma values for the second region.

3. The method of claim 1, wherein generating the corrected histogram comprises:
    determining, by the computing device, a luma offset value; and
    shifting, by the computing device, the luma values of a portion of the subset of the pixels by the luma offset value.

4. The method of claim 3, wherein the portion of the subset of the plurality of pixels is defined by the pixels having luma values below a midtone cutoff value.

5. A computing device, comprising:
one or more processors; and
one or more memories storing computer-executable instructions that, when executed by the one or more processors cause the computing device to:
receive an image comprising a plurality of pixels, each pixel of the plurality of pixels associated with a respective channel value of a plurality of respective channel values;
determine a region within the image, the region comprising a subset of the plurality of pixels of the image;
generate a histogram of the plurality of respective channel values of the subset of the plurality of pixels in the region, the histogram corresponding to a distribution of the plurality of respective channel values in the region;
generate, using the histogram and based at least in part on a channel level bin of the histogram containing a number of the subset of the plurality of pixels exceeding a threshold number, a corrected histogram comprising corrected channel values for the subset of the plurality of pixels; and
denoise the corrected channel values to produce denoised channel values for the subset of the plurality of pixels in the region.

6. The computing device of claim 5, wherein the one or more memories store additional instructions that, when executed by the one or more processors, cause the computing device to further identify, based at least in part on the histogram, the channel level bin associated with a minimum channel value of the distribution.

7. The computing device of claim 6, wherein at least one of the corrected channel values is less than the minimum channel value.

8. The computing device of claim 5, wherein the one or more memories store additional instructions that, when executed by the one or more processors, cause the computing device to further identify, based at least in part on the histogram, the channel level bin associated with a maximum channel value of the distribution.

9. The computing device of claim 5, wherein the plurality of respective channel values comprise luma values.

10. The computing device of claim 5, wherein the plurality of respective channel values comprise chroma values.

11. The computing device of claim 5, wherein the distribution of the plurality of channel values is characterized by normally-distributed noise.

12. The computing device of claim 5, wherein denoising the corrected channel values comprises reducing a variance in the corrected channel values while preserving a mean of the corrected channel values.

13. The computing device of claim 5, wherein denoising the corrected channel values comprises applying a shift to the corrected channel values, the shift determined based at least in part on a midtone cutoff value.

14. A non-transitory computer-readable storage medium storing computer-executable instructions that, when executed by one or more processors of a computer system, cause the computer system to at least:
receive, by the computer system, an image comprising a plurality of pixels, each pixel of the plurality of pixels associated with a respective channel value of a plurality of respective channel values;
determine, by the computer system, a region within the image, the region comprising a subset of the plurality of pixels of the image;
generate, by the computer system, a histogram of the respective channel values of the subset of the plurality of pixels in the region, the histogram corresponding to a distribution of the respective channel values in the region, the distribution characterized by normally-distributed noise in the respective channel values;
identify, by the computer system using the histogram, a channel level bin containing a number of the subset of the plurality of pixels in excess of a threshold number;
generate, by the computer system using the histogram and based at least in part on the channel level bin, a corrected histogram comprising corrected channel values for the subset of the plurality of pixels;
denoising, by the computer system, the corrected channel values to produce denoised channel values for the subset of the plurality of pixels in the region; and
generating, by the computer system, a corrected image region of a corrected image comprising a plurality of corrected pixels having the denoised channel values.

15. The non-transitory computer-readable storage medium of claim 14, wherein the image is a first image, wherein the region is a first region, and storing additional instructions that, when executed by the one or more processors, cause the computer system to further:
receive a second image;
determine a second region within the second image, the second region corresponding to a location defined by the region in the first image;
generate a second histogram of second channel values in the second region; and
denoise, based at least in part on the denoised channel values for the first region, the second channel values to produce denoised second channel values for the second region.

16. The non-transitory computer-readable storage medium of claim 14, wherein the channel level bin corresponds to a minimum channel value.

17. The non-transitory computer-readable storage medium of claim 16, wherein at least one of the corrected channel values is less than the minimum channel value.

18. The non-transitory computer-readable storage medium of claim 16, wherein at least one of the corrected channel values is greater than the maximum channel value.

19. The non-transitory computer-readable storage medium of claim 14, wherein the channel level bin corresponds to a maximum channel value.

20. The non-transitory computer-readable storage medium of claim 14, wherein generating the corrected histogram comprises:
determining a channel offset value; and
shifting the channel values of a portion of the subset of the plurality of pixels by the channel offset value.

* * * * *